(12) United States Patent
Meier et al.

(10) Patent No.: US 11,440,405 B2
(45) Date of Patent: Sep. 13, 2022

(54) METHOD FOR OPERATING A MOTOR VEHICLE

(71) Applicant: Robert Bosch GmbH, Stuttgart (DE)

(72) Inventors: Frank Meier, Stuttgart (DE); Frank Brenner, Remseck (DE); Michael Nau, Dornhan/Aischfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/818,181

(22) Filed: Mar. 13, 2020

(65) Prior Publication Data

US 2020/0298701 A1 Sep. 24, 2020

(30) Foreign Application Priority Data

Mar. 18, 2019 (DE) ..................... 10 2019 203 598.1

(51) Int. Cl.
*B60K 28/10* (2006.01)
*F01N 3/20* (2006.01)
*G07C 5/08* (2006.01)
*F01N 11/00* (2006.01)

(52) U.S. Cl.
CPC ............ *B60K 28/10* (2013.01); *F01N 3/2013* (2013.01); *F01N 3/2033* (2013.01); *F01N 11/007* (2013.01); *G07C 5/0816* (2013.01)

(58) Field of Classification Search
CPC ............ F01N 11/007; F01N 2900/104; F01N 2900/1602; F01N 3/2013; F01N 3/2033; F01N 9/00; G07C 5/0816; B60K 28/10
See application file for complete search history.

(56) References Cited

U.S. PATENT DOCUMENTS

| | | | | |
|---|---|---|---|---|
| 6,029,621 A * | 2/2000 | Berels | ..................... | F01M 5/025 123/196 S |
| 8,055,438 B2 * | 11/2011 | Neisen | ................ | F02D 41/1494 701/113 |
| 8,413,423 B2 * | 4/2013 | Roos | .................... | F01N 13/0097 60/284 |
| 10,337,443 B1 * | 7/2019 | Ulrey | .................. | F02D 35/0015 |
| 10,952,282 B2 * | 3/2021 | Ghannam | ............ | H05B 3/0014 |
| 2002/0005178 A1 * | 1/2002 | Iwatani | ................... | F01M 5/021 123/41.14 |
| 2011/0087423 A1 * | 4/2011 | McDonald | .......... | F02D 41/2441 701/111 |

(Continued)

FOREIGN PATENT DOCUMENTS

| | | |
|---|---|---|
| DE | 4225274 A1 | 2/1994 |
| DE | 60131704 T2 | 11/2008 |

(Continued)

*Primary Examiner* — Anthony Ayala Delgado
(74) *Attorney, Agent, or Firm* — Michael Best & Friedrich LLP

(57) ABSTRACT

In a method for operating a motor vehicle having an internal combustion engine, pre-heating measures (7) for reaching operating temperatures for components of the exhaust-gas post-treatment system and/or for a lambda probe of the motor vehicle are provided prior to the departure (10) of the motor vehicle. The activation of a transducer (1) by a driver of the motor vehicle for explicitly announcing an impending departure of the motor vehicle is provided as the trigger for the pre-heating measures (7), in particular for avoiding an unnecessary initiation of pre-heating measures.

7 Claims, 2 Drawing Sheets

(56) References Cited

U.S. PATENT DOCUMENTS

| | | | |
|---|---|---|---|
| 2012/0239271 A1* | 9/2012 | Tajima | G01N 33/1826 |
| | | | 701/102 |
| 2013/0035845 A1* | 2/2013 | Takara | B60W 20/15 |
| | | | 701/113 |
| 2015/0206360 A1* | 7/2015 | Schnurr | F01N 11/00 |
| | | | 701/29.1 |
| 2017/0183999 A1 | 6/2017 | Inoue et al. | |
| 2018/0187585 A1 | 7/2018 | Crawford et al. | |
| 2018/0232958 A1* | 8/2018 | Wang | G06Q 20/42 |
| 2019/0145331 A1* | 5/2019 | Dudar | F02D 41/0007 |
| | | | 123/519 |
| 2019/0242316 A1* | 8/2019 | Dudar | F02P 17/12 |
| 2019/0285017 A1* | 9/2019 | Dudar | F02B 37/18 |

FOREIGN PATENT DOCUMENTS

| | | |
|---|---|---|
| DE | 102018111259 A1 | 11/2018 |
| DE | 102017113366 | 12/2018 |

\* cited by examiner

METHOD FOR OPERATING A MOTOR VEHICLE

BACKGROUND OF THE INVENTION

The present invention relates to a method for operating a motor vehicle having an internal combustion engine, wherein pre-heating measures for reaching operating temperatures for the exhaust-gas post-treatment system and/or a for lambda probe of the motor vehicle are performed prior to starting of the internal combustion engine.

For minimizing emissions, motor vehicles are equipped with an exhaust-gas post-treatment system. Important component parts of exhaust-gas post-treatment systems of this type are one or a plurality of catalytic converters, specific temperatures typically being required for the operation of the latter. For example, a commonplace exhaust-gas catalytic converter for an initial reaction capability requires an operating temperature around 300° C. Furthermore, a lambda probe of the motor vehicle, which measures the residual oxygen content in the exhaust gas and is responsible for setting an optimum air/fuel ratio for the operation of said lambda probe also requires a specific temperature, typically approximately 700° C. In order for these required operating temperatures be reached as fast as possible, motor-internal heating of the catalytic converter, in which the idling rotating speed is increased and the ignition point is delayed so as to enable an increase in the exhaust-gas temperature and thus sufficiently rapid starting-up of the exhaust-gas post-treatment system is hitherto performed after the starting of the engine. Furthermore, an injection of secondary air by means of a secondary-air pump so as to on account thereof increase the proportion of oxygen in the exhaust gas and in conjunction with a "rich" exhaust gas to achieve a sufficient temperature increase in the exhaust gas by way of a post-reaction of the excess fuel in the exhaust-gas system is known for reaching the required temperatures, this likewise guaranteeing starting-up of the exhaust-gas post-treatment system. Apart from said motor-internal measures, motor-external heating measures are furthermore known. For example, electric pre-heating of the exhaust-gas installation by means of an e-catalytic converter (electrically operated heating catalytic converter) and/or the heating of the intake air and/or an exhaust-gas burner for increasing the exhaust-gas temperature can be used for rapidly starting up the exhaust-gas post-treatment system. An exhaust-gas burner herein can additionally also represent a parking heating function.

Since an ideally correct or optimum, respectively, air/fuel ratio is also important for minimizing the emissions, the rapid achievement of the operating temperature of the lambda probe used in the motor vehicle is likewise a contributing factor for the adherence to emission limit values. In order for the required temperature of approximately 700° C. for the lambda probe be achieved, electrical heating of the lambda probe is typically provided.

German first and unexamined publication DE 10 2017 113 366 A1 describes an exhaust-gas post-treatment system in which electric heating measures are provided prior to the starting of the internal combustion engine, so as to enable an efficient exhaust-gas post-treatment already from the start of the internal combustion engine. A door contact switch, a sensor for detecting an occupied seat, or a belt buckle sensor can be used as transducers for triggering the pre-heating measures, for example.

SUMMARY OF THE INVENTION

The present invention provides a method for operating a motor vehicle having an internal combustion engine, wherein pre-heating measures for reaching operating temperatures for components of the exhaust-gas post-treatment system and/or for a lambda probe of the motor vehicle are performed prior to the departure of the motor vehicle. According to the invention, the activation of a transducer by a driver of the motor vehicle for explicitly announcing an impending departure of the motor vehicle is provided as the trigger of the pre-heating measures. On account of this measure it is possible to avoid any unnecessary initiation of pre-heating measures. This is based on the concept that pre-heating measures prior to the departure of the motor vehicle, in particular motor-external heating measures, are performed at a cost to the electric energy available in the motor vehicle. As is known, the electric energy available in the motor vehicle is limited. Above all, a minimum capacity also has to be kept ready in the electric battery of a motor vehicle; the charge level of the battery should in particular not drop below 30%. Otherwise, a flawless starting procedure and the operation of the motor vehicle can longer be guaranteed. This represents a significant problem in the case of conventional motor-internal pre-heating measures. If unnecessary pre-heating measures of this type are performed without a departure of the motor vehicle actually taking place thereafter, the charge level of the battery can very rapidly drop below the required minimum capacity limit such that the orderly operation of the motor vehicle is no longer possible. In order for this problem to be solved, the described method proposes the activation of a transducer by the driver, by way of which the desire for a departure is announced in an explicit, thus intentional, manner. It is thus no longer possible for the case to arise in which the driver only briefly takes a seat in the motor vehicle without actually intending to depart, for example, and on account thereof triggers unnecessary heating measures. These heating measures in the absence of a subsequent departure of the motor vehicle are associated with a significant consumption in terms of electric energy. The capacity of the electric power supply would be very rapidly exhausted, in particular if such unnecessary pre-heating measures were to be repeated. The proposed method, on account of the explicit announcement of the departure request by the driver, avoids any unnecessary initiation of pre-heating measures of this type.

In principle, the pre-heating measures, apart from the motor-external measures, thus in particular electric heating measures, can optionally also comprise motor-internal pre-heating measures. The advantages of the proposed method herein as described above, come to bear in particular in conjunction with the motor-external heating measures.

In one particularly preferred design embodiment of the method, it is provided that, in the event of the driver wishing to depart with the motor vehicle but prior thereto not having announced the departure of the motor vehicle by activating the transducer, the departure of the motor vehicle and/or the engine start is/are delayed if necessary, so as to meanwhile be able to perform suitable pre-heating measures for reaching the required operating temperatures. Alternatively or additionally, a departure by way of an output limitation, or a departure with an output restriction, respectively, can take place so as to minimize the negative influence on emissions. During the delay of the departure it can be provided, for example, that the start of the motor is delayed such that motor-external, in particular electric, pre-heating measures can be performed in this instance. It can also be provided herein that the starting of the engine is indeed possible but the actual departure is delayed. In this case, motor-internal pre-heating measures can optionally also be additionally resorted to.

The driver is preferably made aware of the delay by a warning signal or similar, for example acoustically or by a corresponding optical display. It is advantageous herein when the driver herein is also informed that pre-heating has unfortunately not been able to take place by virtue of the absence of the announced departure request, so that the departure has to be delayed in order to allow the pre-heating measures to catch up. On account of this information the driver learns very rapidly that the explicit announcement of the departure request is expedient.

Electric resistance heating by way of a heating disk, for example, is to be considered as a motor-external heating measure. The operation of an exhaust-gas burner conjointly with an electric secondary-air pump can be used as other and optionally additional measures, for example, such that heating of the components in the exhaust-gas post-treatment system is very rapidly achieved by injecting petrol into the exhaust-gas train and combusting said petrol. Furthermore, heating the intake air, in particular electrically heating the intake air, can be provided as a motor-external heating measure. In principle, further heating measures such as, for example heating measures based on microwaves, may also be considered.

In general, the motor-external heating measures which are carried out in the context of the proposed method are provided for generating a sufficient operating temperature for one or a plurality of components of the exhaust-gas post-treatment system of the motor vehicle, in particular for one or a plurality of catalytic converters. This herein can be, for example, exhaust-gas post-treatment systems of a petrol engine which can be electrically pre-heated, for example by way of an electrically operated heating catalytic converter. Motor-external heating measures for diesel engines can also be used in an analogous manner in this context, for example the pre-heating of an oxidation catalytic converter, a SCR catalytic converter, or a NOx storage catalytic converter. Furthermore, the motor-external heating measures can comprise electrical heating of a lambda probe. After an engine start, the motor-external heating measures can also be combined with motor-internal heating measures so as to also further optimize the respective operating temperatures in the exhaust-gas post-treatment system, for example beyond the starting temperature of the exhaust-gas post-treatment system. For example, the ignition time can be displaced as a motor-internal heating measure, so as to herein trim the degree of efficiency, on account of which the temperature in the exhaust-gas train is likewise increased.

When using an exhaust-gas burner as a pre-heating measure, said exhaust-gas burner can also be utilized in the context of a parking heating when the exhaust-gas burner is coupled to the motor cooling circuit, for example by way of an additional heat exchanger. Overall, a provided parking-heating strategy can be coupled to the motor-external pre-heating of the exhaust-gas system. In the case of a pre-heated engine, the untreated emissions are in particular generally improved, this potentially leading to lower motor-external pre-heating times. Moreover, an activated parking heating is a further criterion which very reliably indicates that an impending departure is also actually to be expected in the case of a driver approaching the vehicle.

The transducer provided for the proposed method can be implemented, for example, as an activation element on an operating installation for a vehicle access control unit. For example, a corresponding softkey or another element can be provided on a transponder of an electronic vehicle access control unit, said softkey or other element being dedicated in such a manner that the departure request is explicitly announced by activating said softkey or element. In a similar way, a softkey or another element can be provided on a key to the motor vehicle, for example. Apart from the activation of a button or a corresponding element, voice and/or gesture recognition may also be provided, for example, so as to explicitly announce the departure request, or the planned departure of the motor vehicle, respectively. Voice and/or gesture recognition can also be implemented, for example, by way of a correspondingly equipped operating installation for a vehicle access control unit, wherein a camera function or a microphone function can optionally be required to this end. The transducer for announcing an impending departure can be implemented in a particularly advantageous manner by way of a mobile apparatus having computer features, thus for example by way of a smartphone, a tablet computer, or similar portable terminals having corresponding connectivity. A microphone and/or a camera of the mobile apparatus herein can be used for announcing the planned departure by way of voice recognition or gesture recognition in the context of a corresponding application, for example. A departure request can however also be explicitly announced by clicking a corresponding box in the context of a correspondingly specified application on a mobile apparatus, for example. It is furthermore possible that the transducer is activatable by way of a correspondingly specified sensor assembly directly on the motor vehicle. For example, a correspondingly dedicated softkey on the door handle or elsewhere can be provided, by way of which the driver announces his/her departure request.

In one preferred design embodiment of the proposed method, it is provided that the state of the electric energy available in the motor vehicle is incorporated as a further criterion for the triggering and/or the extent of the pre-heating measures. The charge level of the on-board battery, or the state of the on-board circuit is thus in particular also checked so as to be able to establish whether sufficient energy is available for the pre-heating measures, in particular for the motor-external pre-heating measures. Furthermore, the extent of the pre-heating measures can also be rendered dependent as a function of the available electric energy.

As a further criterion prior to initiating the pre-heating measures it is furthermore very advantageous to check whether pre-heating measures are required at all. Important variables in this context are, in particular, the external temperature and/or the engine temperature and/or the temperature in the exhaust-gas post-treatment system. For example, when the external temperature is comparatively high, or the engine and the exhaust-gas system are still warm, for example, pre-heating measures can typically be dispensed with. The undershooting of predefinable threshold values in particular in terms of the ambient temperature and/or in terms of the engine temperature and/or in terms of the temperature of the exhaust-gas post-treatment system and/or in terms of the electric state of the on-board circuit can preferably be resorted to as criteria. This is based on the concept that the ambient temperature and/or the engine temperature and/or the temperature of the exhaust-gas post-treatment system in particular in the catalytic converter, or in the region of the catalytic converter, as substantial input variables are decisive as to whether a cold departure is imminent and how the current temperature conditions are in terms of said cold departure. These temperature conditions are advantageously resorted to for a decision whether pre-heating measures are required at all, and how intense said pre-heating measures are potentially to be. In this context, the state of the on-board circuit also plays a part, in particular when electric heating measures are planned. The energy available for the pre-heating measures can be determined by means of the current state of the on-board circuit, the latter being able to be detected, for example, by means of SOC (state of charge) or by way of battery temperature or nominal current or similar, such that the pre-heating measures can be correspondingly directed.

In the context of the proposed method, in one preferred embodiment a departure probability can be calculated, for example in particular when the temperature conditions actually do require heating measures. Based on this departure probability it can then be decided whether the initiation of pre-heating measures is expedient. Potential input variables for calculating the departure probability can be, for example, the date, the time of day, the day of the week, the GPS position, the GPS position history, school holidays, smartphone data (for example driver recognition), a garage door sensor, and similar. A scenario which renders a departure more or less probable can be derived from data of this type. This is expedient particularly in such cases in which the departure request explicitly announced by activating the transducer is to be verified, or in which no explicit departure request has been transmitted but an approach by the driver toward the motor vehicle nevertheless takes place, or has been identified, for example.

Electrical pre-heating of the exhaust-gas post-treatment system by way of an electrically operated heating catalytic converter and/or the activation of an exhaust-gas burner are particularly suitable as pre-heating measures. However, other pre-heating measures can also be carried out additionally or alternatively in the context of the proposed method. The use of an exhaust-gas burner has the particular advantage that the exhaust-gas burner can also be used as a separately activatable parking heating.

Furthermore, it is provided in one preferred design embodiment of the method that the departure of the motor vehicle is delayed as long as the operating temperatures envisaged for components of the exhaust-gas post-treatment system and/or for the lambda probe have not yet been reached by the pre-heating measures carried out. In these cases, the phase including the pre-heating measures can therefore be prolonged, so to speak. It can also be provided herein that the engine start is delayed such that the pre-heating measures take place exclusively in a motor-external manner and no harmful emissions are generated. It can also be provided that the departure of the motor vehicle is indeed delayed but the engine can nevertheless be started. In this case, a pre-heating phase including a combination of motor-external and motor-internal pre-heating measures can take place until the envisaged operating temperatures are reached. In this case too, the driver of the motor vehicle is expediently made aware of the delay and the reason therefor. On account of these measures, cold departures in which excessively high levels of emissions are to be expected are reliably avoided. In the event of envisaged temperatures which are not reached on account of the pre-heating measures it can alternatively or additionally be provided that a departure with an output restriction takes place. However, a further function for switching off or circumventing said delay or output restriction, respectively, so as to nevertheless be able to force a rapid departure in emergencies, can preferably be provided.

In one further preferred design embodiment of the method, the pre-heating measures are terminated in the case in which no departure ultimately takes place within a predefinable temporal period despite the explicit announcement of an impending departure by the driver of the motor vehicle. On account thereof it is ensured that the pre-heating measures are not continued for an excessive duration in the case of a sudden change in plans, or in the departure request, respectively, of the driver, so as to avoid any unnecessary consumption of energy.

By way of the proposed method, an optimal exhaust-gas post-treatment right at the beginning of the driving cycle is possible on account of the pre-heating measures. The proposed method moreover avoids any unnecessary triggering of pre-heating measures which would be associated with a high consumption of energy and corresponding costs and disadvantages. The rapid start-up of the exhaust-gas post-treatment system and thus minimizing the exhaust-gas emissions also at the beginning of a driving cycle has to be documented in order for the statutory emission standards to be met. An external temperature of 20° C. and a maximum idling phase of 20 seconds for a cyclical test had to be met for earlier emission standards, for example. More recent emission standards in terms of the emission limit values set significantly higher requirements, in particular by way of the so-called RDE (real drive emission) cycle, such that a sufficiently rapid intervention of the exhaust-gas post-treatment system is difficult to achieve solely by motor-internal measures. Under RDE conditions, a spontaneous cold departure without an idling phase at an external temperature of −7° C. is inter alia a potential criterion under which the emission limit values have to be adhered to. On account of the omission of the idling phase and the lower starting temperature, motor-internal heating of the catalytic converter is therefore by far not sufficient for achieving the limit values. By way of the proposed method including the motor-external heating measures, it is readily possible for said tough statutory requirements to be met.

Beyond the activation of the transducer for explicitly announcing the planned departure, even further criteria which can be utilized in particular for verifying the transmitted departure request can be resorted to. When the departure request cannot be verified by criteria of this type, the initiated pre-heating measures can be aborted so as to avoid any unnecessary consumption of energy. For example, signals of distance sensors of the motor vehicle which are triggered as a function of a person entering the environment of the vehicle can thus be evaluated. Said distance sensors thus indicate that the driver enters the environment of the vehicle and that a departure is actually impending. Various strategies can optionally be pursued in stages, depending on the distance from the vehicle. In a similar manner, signals of an optical and/or acoustic sensor assembly pertaining to autonomous driving can be considered, said signals being triggered as a function of a person entering the vehicle environment. In a corresponding manner, an entry of the transponder into the near field and the position of said transponder in terms of the vehicle can also be considered. Furthermore, a door open signal and/or an occupied driver seat recognition can be used as a further criterion/further criteria. Furthermore, the position of a mobile phone of a driver of the motor vehicle can be considered in such a manner that it is assumed that a departure is actually imminent when the mobile phone approaches the motor vehicle. Furthermore, a user behavior of a driver of the motor vehicle can be derived by means of data of a mobile phone, for example. For example, by means of identifying the position of the mobile phone of the driver, optionally by way of potentially linking and/or learning or recognizing the user behavior, for example from the date, the time of day, and/or calendar details and similar, this can be utilized so as to be able to derive therefrom probabilities as to whether a start of travel is actually impending. In a similar manner, the position of an identity document equipped with a transponder, for example a corporate ID card, of the driver of the motor vehicle can be evaluated. As soon as it is recognized, for example, that the identity document and thus the driver of the motor vehicle enter the environment of the motor vehicle, the implicit conclusion of a high probability of an actually impending departure can thus be drawn. These various criteria can be utilized as additional criteria for verifying the already explicitly transmitted departure request, and for also being able to terminate the triggered pre-heating measures again in the case of a change in plan of the driver or else an erroneously transmitted departure request. The criteria explained herein can be evaluated individually or in various combinations with one another.

Items of information from satellite-based localization of the motor vehicle in combination with a definition of a home position of the motor vehicle can be resorted to as a further criterion for verifying the transmitted departure request. In this design embodiment, by defining a home position (vehicle home position) which is determined, for example, by means of the destination "home" as established in the navigation system, it is made possible for scenarios to be derived by way of said criterion and by means of the GPS position of the motor vehicle. For example, when "no home position" is recognized, the probability of a departure actually being desired is thus generally increased. This recognition suggests, for example, the scenario of a supermarket, a service area, or similar, such that there is a high probability of a departure being actually imminent.

It can further be provided that an explicit "no-departure request" can be transmitted, for example by way of a mobile apparatus by means of a correspondingly dedicated softkey or button on an operating installation of a vehicle access control unit or by voice recognition or similar. A previously expressed departure request can be recalled on account thereof, so as to be able to rapidly terminate initiated pre-heating measures again in the case of a change of plans. Said explicit announcement of an unintended departure can be very expedient, for example, when loading of the vehicle, maintenance activities, a workshop visit, or similar are planned. In a particularly preferred manner, the utilization of the "trunk" softkey on the transponder of the electronic vehicle access control unit can be provided for being utilized in this context. Furthermore, signals of a sensor assembly which signal the opening of the trunk of the motor vehicle, or a sensor "open/close trunk" on the motor vehicle, can be evaluated in a corresponding manner in order to signal that, potentially despite the original announcement by the driver, there is after all no impending engine start, or no impending departure, respectively. Furthermore, distance sensors on the motor vehicle can be utilized in a corresponding manner, said distance sensor signaling that no approach toward the driver door is intended, but instead an approach in the direction of the trunk is intended or takes place, respectively, for example. Such a signal can also be evaluated as a negative criterion from which it can be concluded with a certain degree of probability that there is after all no imminent engine start, despite the original announcement.

A departure probability and/or an estimation of the time available until an expected start of the internal combustion engine, or until the departure, respectively, are/is preferably determined or performed, respectively, based on the evaluation of the various criteria. Based thereon it is decided whether, and optionally to what extent, motor-external heating measures are performed so as to ensure that the operating conditions for starting the exhaust-gas post-treatment system and/or the lambda probe with a view to the required operating temperature are present conjointly with the start of the internal combustion engine. A comparison with the available electric energy from the on-board circuit preferably takes place when establishing the motor-external heating measures to be performed. This is based on the concept that any excessive stress on the battery on account of the motor-external heating measures is to be avoided in the case of an only minor battery charge, so as to not pose a risk in terms of the impending engine start.

The invention furthermore comprises an operating installation for a vehicle access control unit, said operating installation being distinguished by an activation element by way of which the driver of the motor vehicle can explicitly announce an impending or planned, respectively, departure of the motor vehicle. The activation element can be, for example, a correspondingly dedicated softkey or another element of the operating installation. The activation element can furthermore also be, for example, a camera or a microphone, by way of which corresponding voice recognition or gesture recognition is possible, and by way of which the driver of the motor vehicle can announce his/her departure request. Additionally, the operating installation can be designed such that a no-travel start request can also be expressed by way of the operating installation, for example by activating a further softkey or by a multiple activation of the softkey which is provided for transmitting the departure request. On account thereof, it is possible, for example, to recall a previously transmitted departure request. This last-mentioned activation means for transmitting a no-departure request can be, for example, the usually provided trunk softkey which in this instance is correspondingly specified.

The invention furthermore comprises an application for a mobile apparatus having computer features, wherein the application is specified as an activation means for a transducer for explicitly announcing an impending departure of the motor vehicle by a driver of the motor vehicle. The application herein can be specified such, for example, that the departure request and optionally also a no-departure request can be transmitted by pressing a softkey or clicking a corresponding box on the display of the mobile apparatus. In other design embodiments, the application can operate, for example, by way of voice recognition or gesture recognition such that the departure request (or else the no-departure request) can be transmitted in a very simple and intuitive manner.

The invention furthermore comprises a computer software which is specified for carrying out the steps of the proposed method. The invention furthermore comprises a machine-readable storage medium on which such a computer software is stored, and the electronic control apparatus which is specified for carrying out the steps of the proposed method.

BRIEF DESCRIPTION OF THE DRAWINGS

Further features of the proposed method are derived from the description hereunder of exemplary embodiments in conjunction with the drawings. The individual features herein can be implemented in each case individually or in mutual combination.

In the drawings.

DETAILED DESCRIPTION

Figure 1:
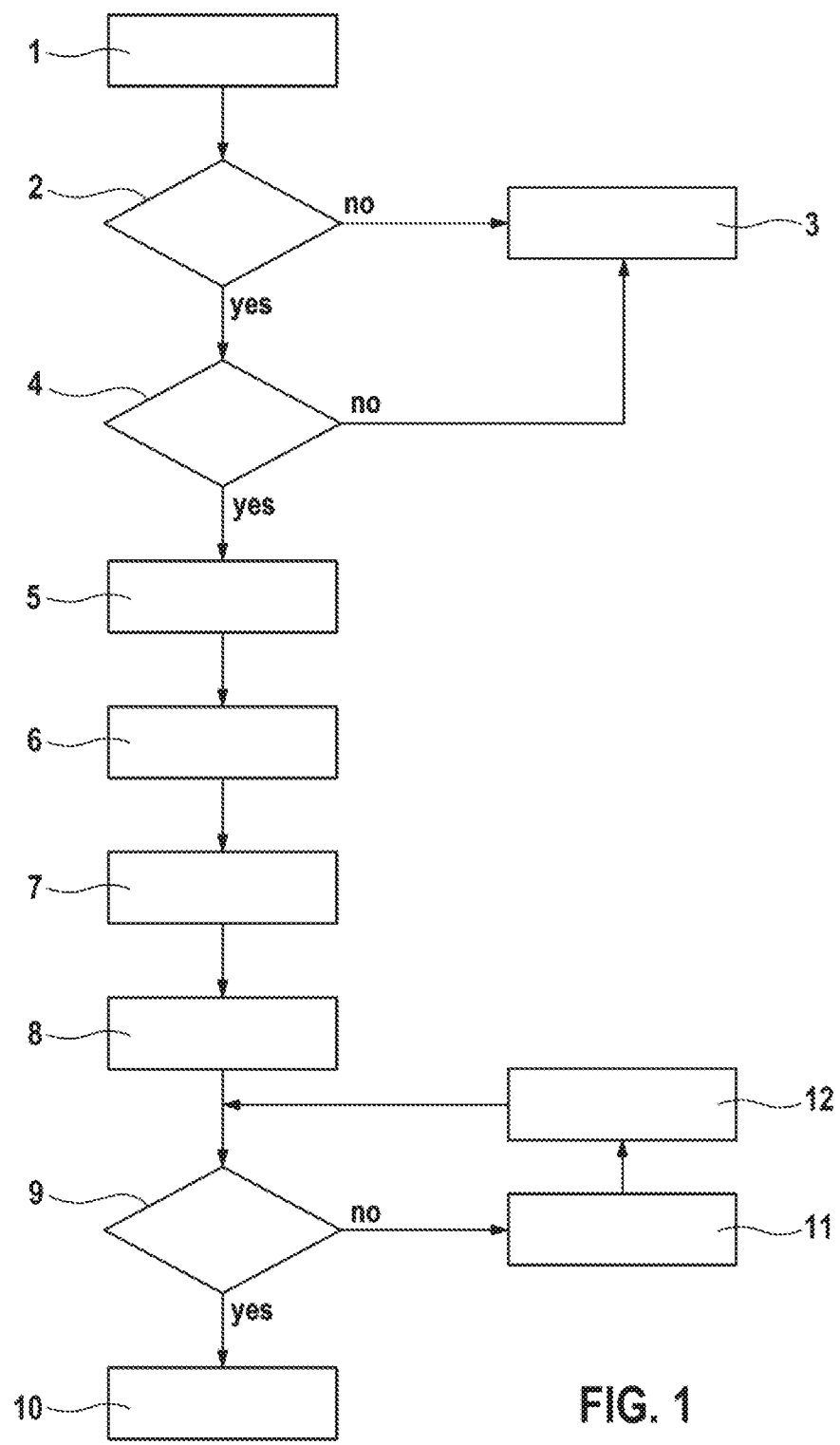
FIG. 1 shows a schematic sequence diagram of a preferred design embodiment of the proposed method in the case of an announced travel start request.

FIG. 1 illustrates an exemplary sequence diagram of the proposed method. In step 1, the driver, for example by activating a correspondingly specified softkey on a transponder of an electronic vehicle access control unit, or by a voice command in the context of a corresponding application on the smartphone of said driver, announces the travel start request. Once said travel start request has been transmitted to a corresponding control installation of the motor vehicle, it is tested in a subsequent check 2 whether corresponding temperature conditions, for example in terms of the external temperature, the temperature in the region of the catalytic converter, etc., require motor-external pre-heating measures. If this is not the case, the method in step 3 is terminated in such a manner that no motor-external pre-heating measures take place such that a departure can take place without any further heating measures. If the temperature conditions are such that motor-external pre-heating measures are required, it is tested in the check 4 whether the driver is actually approaching the vehicle. This can take place, for example, based on an identifiable movement of a transponder, by means of distance sensors or a further sensor assembly, for example from the field of autonomous driving. Furthermore, a driver trajectory on the path toward the vehicle can potentially be determined. When it is recognized in the check 4 that the driver is not approaching the vehicle, the method (step 3) can be aborted without further pre-heating measures, since it is to be assumed that no departure ultimately takes place despite the original plan of the driver. When the driver is approaching, the available time up to an engine start to be expected and/or departure is estimated based on the criteria considered in the check 2. The prediction of the point in time at which the engine start is to be expected herein can optionally be improved by adapting or modeling and training of a corresponding model pertaining to the driver behavior based on procedures from the past. Depending on the available time window, establishing the required motor-external heating measures takes place in step 6. This takes place in particular also by way of a comparison with the available electric on-board circuit, or the battery state, respectively. It is in particular established herein which heating measures are started when and at what output. The one pre-heating phase by way of motor-external heating measures is correspondingly started in step 7. After an engine start 8, it is tested in the check 9 whether the temperatures, in particular the cat-light-off temperature, required for a required conversion of pollutants has been reached. The same applies in analogous manner for the operating temperature of a lambda probe. When said temperature conditions have been achieved, the vehicle departure can take place in step 10. When the temperature conditions have not been achieved, a delay of the departure takes place in step 11, or a departure with an output restriction can take place. The delay of the departure can be associated with a further pre-heating measure in step 12, in which the motor-external heating measures are combined with motor-internal heating measures, for example with a homogeneous-split-injection, with the setting of delayed ignition angles, and similar. The check 9 whether the temperature conditions for the required conversion of pollutants has been achieved can subsequently take place again. If this is the case in this instance, the engine departure 10 can take place. When a delay 11 takes place, a warning to the driver, for example by way of an optical or acoustic signal expediently performed.

In the case of urgent emergency departure cases it can be provided that the departure lock, or the delay 11, respectively, is "overridden". The number of emergency departure cases of this type can be summarized by a counter in the ECU (engine control unit) and be limited to a maximum number. The counter in this instance can optionally only be reset in the workshop and be documented by way of an OBD (on-board diagnostics) interface.

Should the estimation of the time which remains to an envisaged engine start or a departure as performed in step 5 result in the prediction that the required temperatures cannot be achieved on account of motor-external and optionally motor-internal heating measures, it can be provided that the departure is delayed for so long until the required functioning of the exhaust-gas post-treatment system is guaranteed. Here too, the driver is expediently made aware of the delay.

Should no engine start take place within the expected temporal horizon, despite the announcement by the driver (step 1), it can expediently be provided that the motor-external heating measures are carried out only for a specific temporal period such that the pre-heating measures can then be aborted when no foreseeable departure is to take place anymore. This can be made dependent on further criteria, for example on the temperature of the catalytic converter, on an occupied driver seat recognition ("is there anyone at all still in the vehicle?"), on a door-closed signal, and/or on signals of a near-field sensor assembly which suggest a departure of the driver from the environment of the vehicle, for example an increasing distance to the transponder. Furthermore, the upholding of the pre-heating phase can be made dependent on whether the on-board circuit state is adequate.

Figure 2:
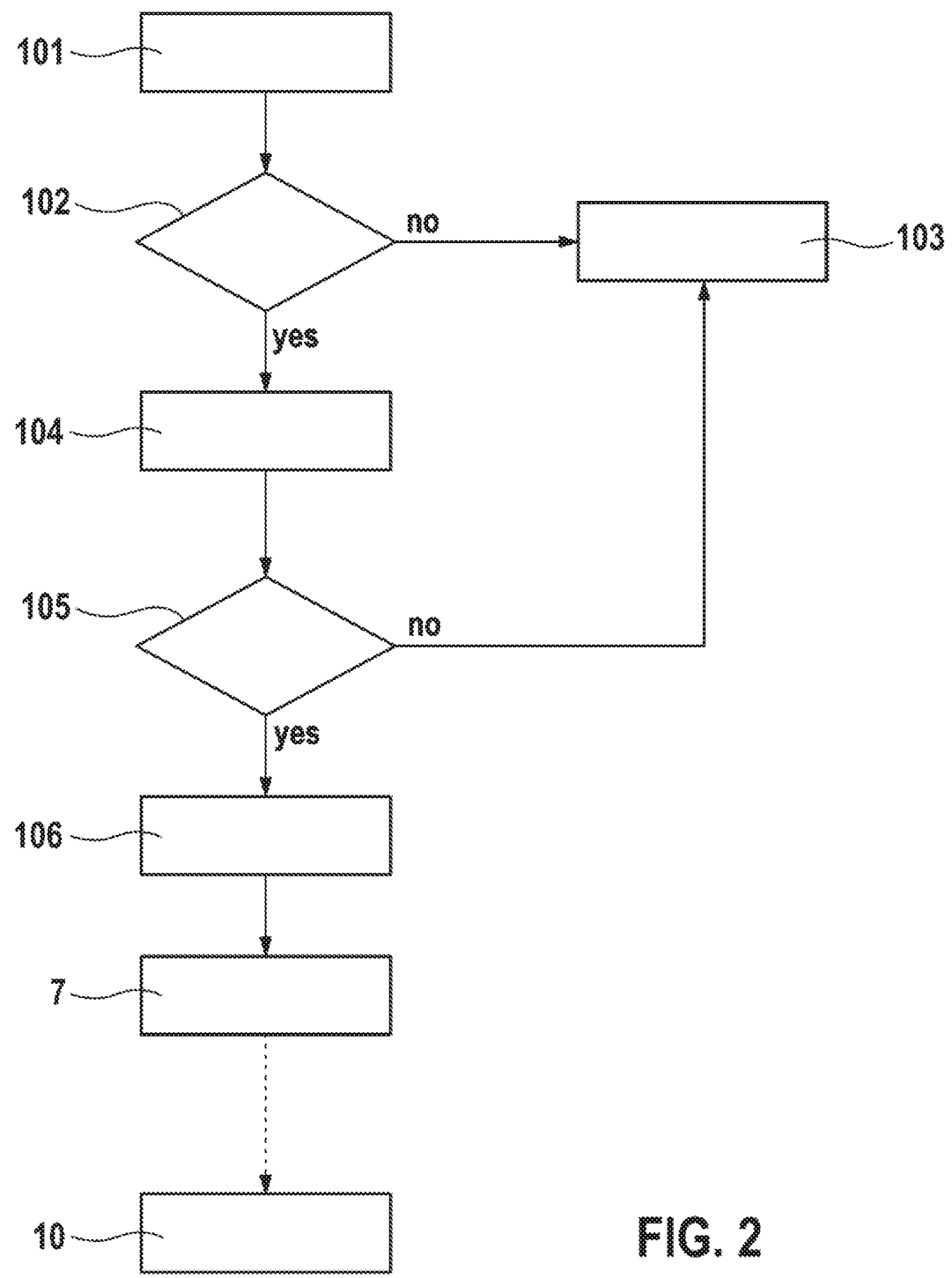
FIG. 2 shows a schematic sequence diagram of a preferred design embodiment of the proposed method without an announced travel start request.

In a further scenario, the driver approaches the motor vehicle but no explicit travel start request is expressed or transmitted, respectively. This scenario is illustrated in FIG. 2 as a further exemplary design embodiment for carrying out the method. When the driver thus approaches and no travel start request is expressed (step 101), the following sequence can be carried out should the travel start take place without announcement and a cold departure which for emission reasons is disadvantageous or optionally delayed is to be avoided. The check 102 whether the temperature conditions, for example the external temperature and/or the temperature in the exhaust-gas post-treatment system, require motor-external pre-heating measures takes place first. If this is not the case, the method can be stopped in step 103, and no heating measures are carried out. Should the temperature conditions require heating measures, a departure probability is calculated in step 104. Potential input variables herein can be, for example, the date, the time of day, the day of the week, the GPS position, the GPS position history, school holidays, smartphone data (for example driver recognition), a garage door sensor, and similar. Using the method of data mining, a corresponding model can be trained based on data of this type, and/or the departure probability can be calculated based thereon. Should the check 105 result in the departure probability being only very low, the method can be terminated by way of step 103, such that no further pre-heating measures are performed, since a departure is no longer to be taken into account. Should the check 105 result in the predicted departure probability being high, the engine start and/or the departure is delayed in step 106, such that pre-heating measures can meanwhile be resorted to in step 7. The driver is made aware of the delay and the reason therefor by a suitable, for example acoustic or optical, warning signal. The following steps correspond to the method explained by means of FIG. 1. Reference in this context is made to the corresponding description.

Overall, the proposed method and the measures described herein permit a spontaneous cold departure according to the statutory emission requirements to be possible even without delaying the departure, or to be able to be ensured by way of only a minimum delay. Motor-internal heating measures, in particular catalytic-converter heating measures, can be stepped down, this being associated with expectations of further advantages in terms of particle emissions.

The invention claimed is:

1. A method for operating a motor vehicle having an internal combustion engine, wherein pre-heating measures (7) for reaching operating temperatures for components of the exhaust-gas post-treatment system, for a lambda probe of the motor vehicle, or both are performed prior to the departure (10) of the motor vehicle, wherein the activation of a transducer (1) by a driver of the motor vehicle for explicitly announcing an impending departure of the motor vehicle is provided as a trigger of the pre-heating measures (7), wherein the departure of the motor vehicle is delayed (11) as long as the operating temperature envisaged for components of the exhaust-gas post-treatment system, for the lambda probe, or for both have not yet been reached by the pre-heating measures.

2. A method for operating a motor vehicle having an internal combustion engine, wherein pre-heating measures (7) for reaching operating temperatures for components of the exhaust-gas post-treatment system, for a lambda probe of the motor vehicle, or both are performed prior to the departure (10) of the motor vehicle, wherein the activation of a transducer (1) by a driver of the motor vehicle for explicitly announcing an impending departure of the motor vehicle is provided as a trigger of the pre-heating measures (7), wherein the pre-heating measures are terminated in the event that no departure takes place within a predefinable temporal period despite the explicit announcement of an impending departure.

3. An electronic control apparatus configured to control operation of a motor vehicle having an internal combustion engine, wherein pre-heating measures (7) for reaching operating temperatures for components of the exhaust-gas post-treatment system, for a lambda probe of the motor vehicle, or both are performed prior to the departure (10) of the motor vehicle, wherein the activation of a transducer (1) by a driver of the motor vehicle for explicitly announcing an impending departure of the motor vehicle is provided as a trigger of the pre-heating measures (7), and wherein the departure of the motor vehicle is delayed (11) as long as the operating temperature envisaged for components of the exhaust-gas post-treatment system, for the lambda probe, or for both have not yet been reached by the pre-heating measures.

4. The electronic control apparatus according to claim 3, wherein the pre-heating measures are terminated in the event that no departure takes place within a predefinable temporal period despite the explicit announcement of an impending departure.

5. The electronic control apparatus according to claim 3, wherein, in the event of a requested departure of the motor vehicle without any prior activation of the transducer by the driver, the departure of the motor vehicle, the engine start, or both are delayed and pre-heating measures (7) are performed.

6. The method according to claim 1, wherein the pre-heating measures are terminated in the event that no departure takes place within a predefinable temporal period despite the explicit announcement of an impending departure.

7. The method according to claim 1, wherein, in the event of a requested departure of the motor vehicle without any prior activation of the transducer by the driver, the departure of the motor vehicle, the engine start, or both are delayed and pre-heating measures (7) are performed.

* * * * *